UNITED STATES PATENT OFFICE.

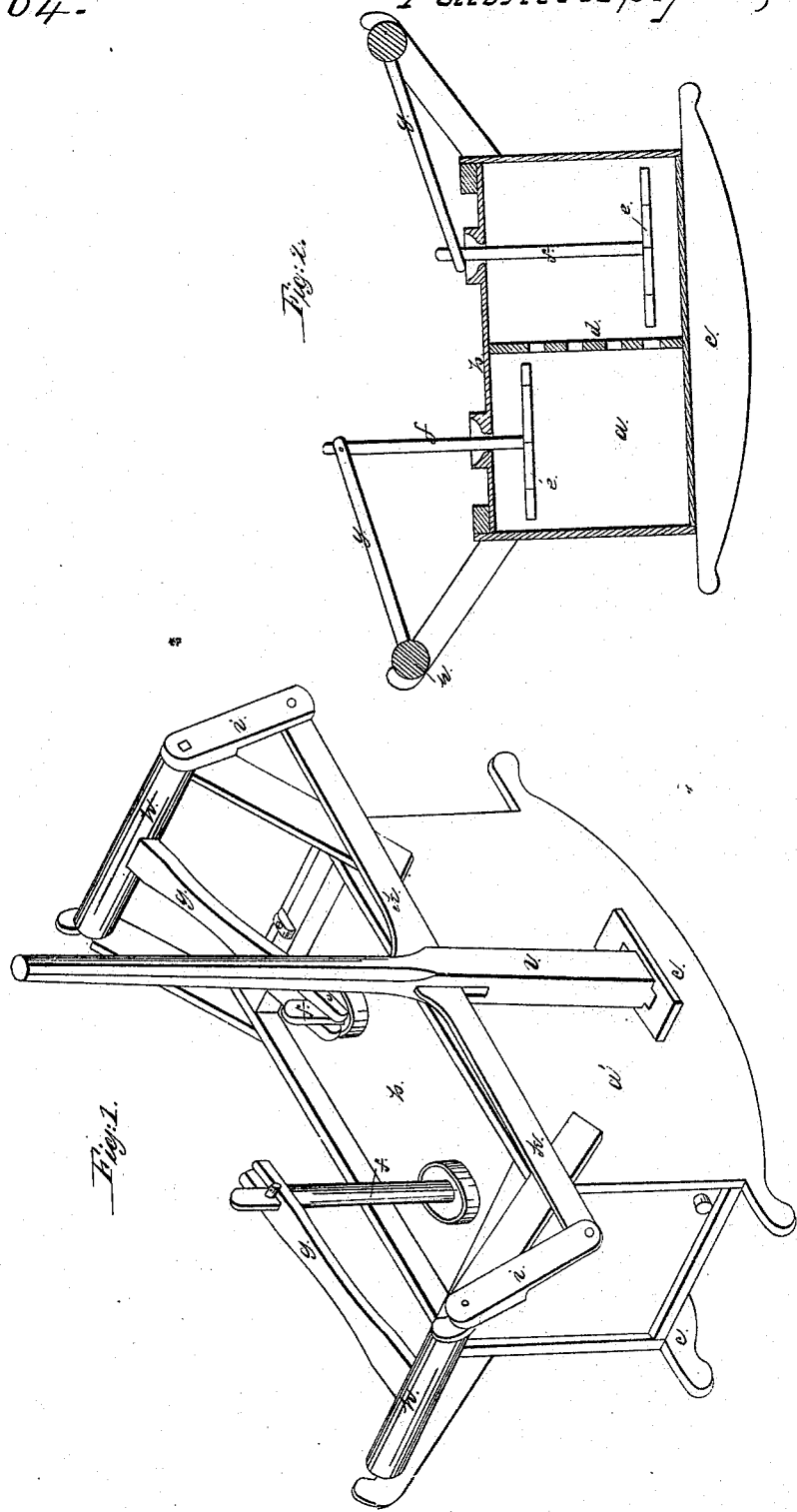
A. C. Stiles,
Churn.
Nº 3,764.
Patented Sep. 27, 1844.

A. C. STILES, OF SOUTH BLOOMFIELD, OHIO.

ROCKING CHURN.

Specification of Letters Patent No. 3,764, dated September 27, 1844.

*To all whom it may concern:*

Be it known that I, A. C. STILES, of South Bloomfield, in the county of Pickaway and State of Ohio, have invented a new and useful Improvement in Churns; and I do hereby declare that the following is a full, clear, and exact description thereof, reference being had to the accompanying drawing, which forms a part of this specification, in which—

Figure 1 is a perspective view. Fig. 2 is a sectional elevation longitudinally through the center.

The nature of my invention consists in constructing a double dasher churn on rockers with a partition through the center so as to be rocked by the same lever that works the dashers.

The construction is as follows: An oblong box $a$, is made with a close fitting cover $b$, the whole size of the top. This box is placed on rockers $c$, that run lengthwise, and in the middle of the length of the box there is a cross partition $d$, with holes bored through it. On each side of this partition there is a dasher $e$, which is nearly the size of the space, from the center of which a handle $f$, stands up through a hole in the cover; and above the cover it is jointed to the end of a horizontal arm $g$, that extends out from a shaft or roller $h$, supported on studs attached to the box, one of said shafts being across each end, another arm $i$ extends down from the end of each of the shafts outside the box and they are connected by a horizontal connecting bar $k$, that reaches from one to the other; to the center of this is jointed a lever $l$, the fulcrum of which is near the bottom of the box and its upper end projects up some distance above the top thereof for a handle by which the machine is worked; by this arrangement the cream is churned into butter in the most expeditious manner.

The machine is operated by moving the upright lever $l$, to and fro, which rocks the box, while at the same time it works the dashers up and down, that throwing the cream through the partition $d$, till the butter is made.

What I claim in the above machine, and desire to secure by Letters Patent is—

The combination of the rockers and dashers in the double chambered churn constructed and operating in the manner and for the purpose herein set forth.

A. C. STILES.

Witnesses:
 GEO. WEAVER,
 ROWLAND STEBBINS.